US012540486B2

(12) United States Patent
Mollick

(10) Patent No.: US 12,540,486 B2
(45) Date of Patent: Feb. 3, 2026

(54) PUSH-IN-PLUNGER-LOCK WITH SECURABLE HOUSING CYLINDER

(71) Applicant: Peter Joseph Mollick, Phoenix, AZ (US)

(72) Inventor: Peter Joseph Mollick, Phoenix, AZ (US)

( * ) Notice: Subject to any disclaimer, the term of this patent is extended or adjusted under 35 U.S.C. 154(b) by 313 days.

(21) Appl. No.: 18/377,298

(22) Filed: Oct. 5, 2023

(65) Prior Publication Data

US 2025/0075528 A1 Mar. 6, 2025

Related U.S. Application Data

(60) Provisional application No. 63/536,471, filed on Sep. 4, 2023.

(51) Int. Cl.

*E05B 1/00* (2006.01)
*E05B 15/00* (2006.01)
(Continued)

(52) U.S. Cl.

CPC ........ *E05B 1/0038* (2013.01); *E05B 17/2084* (2013.01); *E05B 19/0047* (2013.01);
(Continued)

(58) Field of Classification Search

CPC ............. E05B 19/0041; E05B 19/0047; E05B 19/0076; E05B 27/001; E05B 27/0046;
(Continued)

(56) References Cited

U.S. PATENT DOCUMENTS 3,338,359 A * 8/1967 Baillie .................... B63B 25/24 254/235
4,069,696 A * 1/1978 Steinbach ............ E05B 27/083 70/404
(Continued)

FOREIGN PATENT DOCUMENTS

GB 2385631 A * 8/2003 ........... E05B 27/083
WO WO-2008034345 A1 * 3/2008 ......... E05B 29/0013

*Primary Examiner* — Christine M Mills
*Assistant Examiner* — Faria F Ahmad

(57) ABSTRACT

The invention relates to a push-in-plunger-lock and housing-cylinder that facilitates an easy removal and installation of the push-in-plunger-lock as it attaches to a lockable device. Normally the push-in-plunger-lock can be mounted to a lockable device using two flanges with holes or threads on the lock being secured in place with a locknut ring. In certain particular applications of using the push-in-plunger-lock there is no suitable application to mount the lock other than metal welding the push-in-plunger-lock to the lockable device. One of these particular applications is mounting the push-in-plunger-lock on a ratchet chain binder to block the use of the U-pawl preventing the normal operational removal of the ratchet chain binder from a chain. The invention provides a housing-cylinder to insert the push-in-plunger-lock into while securing the lock in place with a pin. The pin can only be removed when the push-in-plunger-lock is in the unlocked position. The invention allows the push-in-plunger-lock to be easily changed and matched to keyed alike other push-in-plunger-locks instead of re-keying the push-in-plunger-locks or allowing the replacing of a defective push-in-plunger-lock that would involve grinding the defective push-in-plunger-lock from the lockable device and metal welding a replacement push-in-plunger-lock onto the lockable device.

14 Claims, 7 Drawing Sheets

(51) Int. Cl.

*E05B 17/20* (2006.01)
*E05B 19/00* (2006.01)
*E05B 27/00* (2006.01)
*E05B 27/08* (2006.01)

(52) U.S. Cl.

CPC ......... *E05B 15/0046* (2013.01); *E05B 27/001* (2013.01); *E05B 27/083* (2013.01)

(58) Field of Classification Search

CPC ...... E05B 27/08; E05B 27/083; E05B 1/0038; E05B 17/2084; E05B 15/0046

See application file for complete search history.

(56) References Cited

U.S. PATENT DOCUMENTS

| | | | | | |
|---|---|---|---|---|---|
| 4,083,211 | A * | 4/1978 | Scherbing | E05B 27/083 70/467 |
| 4,191,036 | A * | 3/1980 | Steinbach | E05B 27/083 70/404 |
| 4,474,041 | A | 10/1984 | Fink, Jr. | |
| 5,148,690 | A * | 9/1992 | Wang | E05B 67/24 70/DIG. 37 |
| 5,177,466 | A * | 1/1993 | Lai | E05B 27/00 200/61.66 |
| 5,870,911 | A * | 2/1999 | DeWalch | H02G 3/14 70/159 |
| 6,325,656 | B1 | 12/2001 | Fukuda | |
| 8,201,427 | B1 | 6/2012 | Anderson | |
| 10,119,299 | B1 * | 11/2018 | Wu | E05B 27/0032 |
| 11,088,491 | B2 | 8/2021 | Ikeya | |
| 2006/0096344 | A1 * | 5/2006 | Lee | E05B 27/0032 70/491 |
| 2019/0071893 | A1 * | 3/2019 | Faninger | E05B 19/0047 |
| 2022/0349211 | A1 * | 11/2022 | Lee | E05B 19/0047 |
| 2023/0054352 | A1 * | 2/2023 | Lee | E05B 27/001 |

* cited by examiner

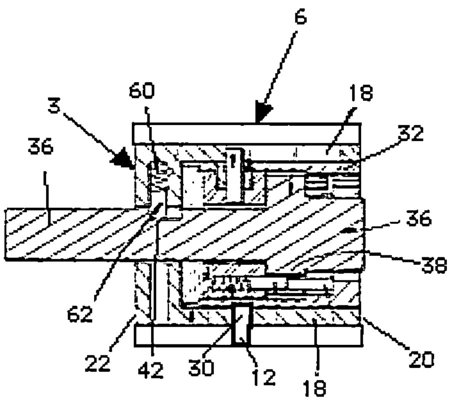
FIG. 2b
Amended
Amended
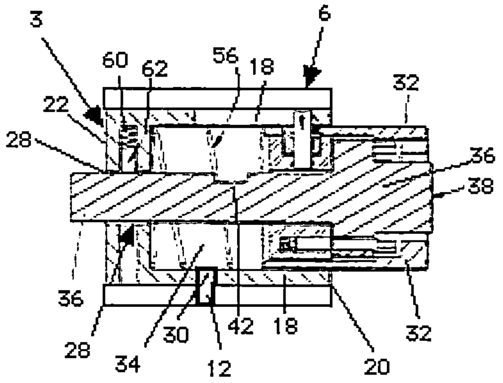
FIG. 3b
Amended

PUSH-IN-PLUNGER-LOCK WITH SECURABLE HOUSING CYLINDER

CROSS-REFERENCE TO RELATED APPLICATIONS

This application claims the benefit of U.S. Provisional Application No. 63/536,471 titled "PUSH-IN-PLUNGER-LOCK WITH SECURABLE HOUSING" filed Sep. 4, 2023, the contents of which are incorporated herein by reference in their entirety.

BACKGROUND OF THE INVENTION

1. Field of the Invention

The invention relates to push-in-plunger locks that are attached to a lockable device and wherein the plunger extends and retracts in a longitudinal motion to lock or block the use of a lockable device. The USPTO class (70/DIG20), "Push to Project and Lock Bolt, key-released" is related to this invention. The characterizing feature of the invention is a housing-cylinder that secures the lock in place to prevent removal of the lock by an unauthorized person. The lock can only be removed from the housing-cylinder while the lock is in an unlocked position.

2. Description of Related Art

The push-in-plunger type of lock utilizes a plunger rod to lock or block a device as opposed to a shackled padlock to lock a device. A shackle is usually U-shaped with both ends secured in a lock body in the padlock. A push-in-plunger style lock is many times used as a blocking device that locks or prevents the use of another device.

Although there are various ways to mount or attach push-in-plunger locks to a lockable device such as a drawer, cabinet, or sliding door where the lock plunger either inserts into a hole or blocks a device from moving, the two most common attachment methods are flanges and screws, or threads and a locknut. Both of these aforementioned attachment methods usually require the lock to be unlocked to remove or replace the lock, in each case, the drawer would need to be opened, the cabinet would need to be opened, or the sliding door would need to be moved into the open position to access the screws or locknut.

In certain situations the attachment style of flanges and screws or threads and a locknut will not be possible or feasible because of area constraints, or the device to be locked is portable and without a concealing device such as a drawer, or as in the case of locking out the use a device such as a portable ratchet chain binder that comprises a blocking device, (see U.S. Pat. No. 11,440,458 Mollick). In these certain non-feasible situations, the push-in-plunger-lock can be attached to the lockable device by metal welding the push-in-plunger-lock outside cylinder directly to the lockable device such as the ratchet binder. (see FIG. 3 prior art) The metal welding attachment method to a device such as the ratchet binder (or any other device) will securely hold the push-in-plunger-lock in place in normal use.

With a push-in-plunger-lock welded in place to the ratchet binder, the user of the ratchet binder has a very efficient method to lockout the use of the ratchet binder when the ratchet binder is securing chains on a load. Locking out the ratchet binder use will help prevent or deter theft of the items secured by the ratchet binder and chains if required.

In a first scenario, using the ratchet binder or multiple ratchet binders with a metal welding attachment method of the lock exterior cylinder to the ratchet binder for securing the push-in-plunger-lock to the ratchet binder may cause an inconvenience if the user prefers all of the push-in-plunger locks to be keyed alike. While it is true that multiple ratchet binders with the attached locks can be ordered keyed alike, there is a good probability that a user of ratchet binders will purchase or somehow obtain other ratchet binders that are not keyed alike to the original keyed alike ratchet binders. In this first scenario, the user of the ratchet binders can normally have the locks in question re-keyed by a locksmith to match the original locks in the other ratchet binders, although the expense and time of taking the device to a locksmith can be a substantial burden to the user.

In a second scenario, an individual ratchet binder with a metal welding attachment method of attaching the lock to the ratchet binder may comprise a lock that becomes defective and needs to be replaced. Even though another push-in-plunger-lock may be able to be ordered, the defective push-in-plunger-lock will have to be removed from the ratchet binder with a grinding tool and the new push-in-plunger-lock metal welded in place to the ratchet binder. The removal of the existing lock and the attachment of the new lock will incur an additional expense that may exceed the cost of the original complete ratchet binder. The additional expense does not include re-painting of the ratchet binder (or other device) where the metal grinding was performed.

In summary of the first and the second scenario's concerning re-keying or replacing a push-in-plunger-lock, both scenario's will cause an inconvenience and additional expense to the ratchet binder (or other device) user. Re-keying a push-in-plunger-lock will most likely require the services of a locksmith to disassemble and then reassemble the lock. Re-keying a push-in-plunger-lock requires working with very small parts such as springs and pins in addition to special tools required for the disassembly and assembly of the push-in-plunger-lock. Having the push-in-plunger-lock re-keyed will most likely incur much more expense than simply purchasing a new push-in-plunger-lock that is keyed alike to the other locks. If the user of the ratchet binder (or other device) purchases a new keyed alike push-in-plunger-lock to replace a defective lock, the existing lock will need to be removed with grinding tools and the new push-in-plunger-lock re-installed with a metal welding method, causing additional expense and down time for the device that would also exceed the cost of purchasing a new keyed alike lock.

BRIEF SUMMARY OF THE INVENTION

The disclosed invention solves the problem of both the above first scenario and the second scenario. The invention comprises a prior art push-in-plunger-lock supplemented with and surrounded by a separate housing-cylinder. The housing-cylinder comprises a device called a cylinder-pin to secure the lock to the housing-cylinder. The housing-cylinder can be securely attached to a device such as the ratchet binder (or other suitable device) while the push-in-plunger-lock inserts into the housing-cylinder and is then secured in the housing-cylinder by the cylinder-pin that pins or attaches the housing-cylinder to an outer first-cylinder of the lock (see FIGS. 5 and 7). The cylinder-pin can only be removed from the housing-cylinder when the push-in-plunger-lock is in the unlocked position and the cylinder-pin must be pushed in to the inside of the lock to a first-clearance-area 34 to release the lock from the housing-cylinder. The cylinder-pin in an installed-position maintains a locked-position of the push-in-plunger-lock first-cylinder and the housing-cylinder. The housing-cylinder, the first-cylinder, and the second-cylinder are all sleeve cylinders that encircle another part of the device. Another feature of the invention is the requirement that the cylinder-pin maintains a very tight fit in a housing-cylinder third hole, but maintains a loose fit in the lock first-cylinder second hole. The required feature allows the cylinder-pin to be easily removed from the push-in-plunger-lock first-cylinder when the cylinder-pin is still recessed into the push-in-plunger-lock first-cylinder.

The cylinder-pin comprises smooth sides like a peg and can only be removed from the housing-cylinder by pushing the cylinder-pin inwards towards the inside of the push-in-plunger-lock first-clearance-area 34 (see FIG. 3). A second-cylinder (see FIG. 3) of the push-in-plunger-lock prevents the cylinder-pin from being moved into the first-clearance-area when the push-in-plunger-lock is in the locked position. When the push-in-plunger-lock is in the locked position, the second-cylinder covers the second hole in the first-cylinder (see FIG. 1 and FIG. 2) of the lock preventing the cylinder-pin from be pushed into the first clearance area of the lock, therefore securing the lock in the housing-cylinder when the lock is in the locked position. Once the lock is placed in the unlocked position, the second-cylinder moves away from the second hole of the first-cylinder, allowing the cylinder-pin to be moved into the first-clearance-area allowing the push-in-plunger-lock to be removed from the housing-cylinder by pulling the lock out of the housing-cylinder. With the new keyed alike lock unlocked or locked position, the lock can be inserted into the housing-cylinder while aligning the third hole of the housing-cylinder and the second hole of the lock first-cylinder to install the cylinder-pin and secure the new lock in place.

In the above first scenario, a system comprising the push-in-plunger-lock and the housing-cylinder attached to a lockable device such as the ratchet binder or other device allows the user of the device to easily remove the non-keyed alike push-in-plunger-lock from the housing-cylinder and install another push-in-plunger-lock that is keyed alike the remaining other devices. Ordering additional keyed alike push-in-plunger-locks from a distributor is easy, cost efficient, and time saving when compared to taking the device to a locksmith for a keying alike procedure to be performed.

In the above second scenario, a system comprising the push-in-plunger-lock and the housing-cylinder attached to a lockable device such as the ratchet binder or other device allows the user of the device to easily remove the defective push-in-plunger-lock from the housing-cylinder and install another push-in-plunger-lock that is keyed alike the remaining other devices. Installing the keyed alike push-in-plunger-lock in place of a defective push-in-plunger-lock in the housing-cylinder is much easier and cost efficient when compared to grinding the defective lock off of the ratchet binder or other device and re-attaching another push-in-plunger-lock using a metal welding procedure.

The special characterization of the invention is the unique housing-cylinder and cylinder-pin design and positioning of the cylinder-pin aligned with the hole in the push-in-plunger-lock that is covered by the second-cylinder of the lock when the lock is in the locked position, creating the inability to remove the cylinder-pin from the housing-cylinder when the lock is in the locked position. The cylinder-pin is designed to be only viable to be removed from the housing-cylinder by pushing the cylinder-pin towards the center of the push-in-plunger-lock and into the first-clearance-area (see FIG. 3). The inability of the cylinder-pin being able to be removed in an outwards direction from the housing-cylinder is facilitated by the cylinder-pin outer facing edge being even with or nearly even with the exterior of the housing-cylinder, preventing a pulling or turning action of the cylinder-pin for the lack of ability to grab onto the cylinder-pin with or without tools to pull and remove the cylinder-pin from the housing-cylinder and the push-in-plunger-lock outer cylinder sleeve. The cylinder-pin is a non-threaded cylinder-pin not resembling a screw.

When installing the cylinder-pin in the housing-cylinder and into the lock's first-cylinder second hole to secure the lock in place, care must be taken to size the length of the cylinder-pin so the cylinder-pin does not extend down past the locks first-cylinder that would cause the cylinder-pin to contact the lock's second-cylinder when the lock is placed in the locked position. Releasing the lock from the housing-cylinder only requires the cylinder-pin to be moved down and past the housing-cylinder third cylinder with a portion of the cylinder-pin being moved into the first clearance area of the lock.

The cylinder-pin should have a very tight fit into the housing-cylinder third hole and the housing-cylinder third hole should be responsible for holding the cylinder-pin in position creating a locked-position of the cylinder-pin (see FIG. 8). The tight fit of the cylinder-pin into the housing-cylinder third hole should require a punch tool to move the cylinder-pin out of the housing-cylinder third hole and into the first-clearance-area of the lock. The first-cylinder second hole should provide the loose fit for the cylinder-pin and should allow the cylinder-pin to fall freely or be easily pushed into the first-clearance-area 34 from the first-cylinder second hole when the cylinder-pin is removed from the housing-cylinder third hole. A required design of the invention is for the cylinder-pin to fit into the housing-cylinder third hole in a very tight fit and for the cylinder-pin to fit into the first-cylinder second hole in a loose fit, mandating the housing-cylinder third hole comprise a smaller diameter hole when compared to any diameter of the first-cylinder second hole, and therefore, attaching the housing-cylinder to the first-cylinder, The loose fit of the cylinder-pin in the first-cylinder second hole enables the cylinder-pin to be removed from both the first-cylinder second hole and the first-clearance-area by simply using gravity, or a shaking motion of the push-in-plunger-lock, or by adjusting the spring tension if the spring is in contact with the cylinder-pin. If the cylinder-pin was also a tight fit inside the first-cylinder second hole, the cylinder-pin would be nearly impossible to remove from the first-cylinder second hole when the cylinder-pin is pushed from and clearing the housing-cylinder third hole. A preferred configuration of the first-cylinder second hole may be an elongated or oval shaped hole positioned perpendicular to the first-cylinder slot.

If the cylinder-pin were installed with a tight fit in the housing-cylinder third hole and with a tight fit in the first-cylinder second hole, the housing-cylinder and push-in-plunger-lock combination would still work as designed to secure the push-in-plunger-lock in the housing-cylinder and allow the push-in-plunger-lock to be removed from the housing-cylinder after moving the cylinder-pin to the unlocked-position (see FIG. 9), but the removed push-in-plunger-lock would not be reusable for the reason the cylinder-pin would still be lodged in the first-cylinder second hole and positioned in the first-clearance-area blocking the second-cylinder from being moved into a locking position. With no easy or practical method to remove the cylinder-pin from the first-cylinder second hole tight fit that would also remove the cylinder-pin from the first-clearance-areas, short of drilling the cylinder-pin out of the first-cylinder second hole, the push-in-plunger-lock is now not reusable as design with no foreign objects in the first-clearance-area.

In summary, the characterization's of the invention are:

i) a prior art push-in-plunger-lock;

ii) a prior art push-in-plunger-lock first-cylinder comprising a prior art second hole and wherein the second hole is covered by the push-in-plunger-lock second-cylinder when the lock is in the locked position;

iii) a cylinder housing surrounding the push-in-plunger-lock;

iv) a housing-cylinder third hole aligning with the push-in-plunger-lock first-cylinder second hole for the insertion of a cylinder pin to secure the push-in-plunger-lock in the housing cylinder;

v) the housing-cylinder third hole required to be of a smaller diameter than any diameter of the push-in-plunger-lock first-cylinder second hole;

vi) the housing-cylinder third hole being the holding and securing point of the cylinder-pin with the cylinder-pin maintaining a tight fit in the housing-cylinder third hole and the cylinder-pin maintaining a loose fit in the first-cylinder second hole; and vii) the cylinder-pin in the locked-position maintains the head of the cylinder-pin in an even or nearly even position with the outer surface of the housing-cylinder preventing a viable removal of the cylinder-pin short of drilling the cylinder pin out from the housing-cylinder third hole and first-cylinder second hole.

If the cylinder-pin was replaced with a screw with threads and a screw head such as a Philips screw head and was installed in the housing-cylinder, the screw would be easily outwardly removed from the housing-cylinder even when the lock is in the locked position, allowing an unauthorized person to have access to the unlocked device by removing the lock from the housing-cylinder. Even if the screw employs a security style screw head or a unique configuration screwhead, whether a standard screw or a recessed set-screw, removal of the threaded screw by an unauthorized person using specialized removing tools to grip the screw head is much easier than removing a non-threaded cylinder-pin wherein the head of the cylinder-pin is even or nearly even with the outer surface of the housing-cylinder. Except for a drilling action to destroy and remove the pin, the cylinder-pin can only be removed from the housing-cylinder by pushing the cylinder-pin towards the inside of the housing-cylinder and unlocked lock. Generally, the time and trouble to drill a cylinder-pin out of the housing-cylinder would deter an unauthorized person from removing the cylinder-pin from the housing-cylinder with a drilling action, therefore maintaining the security of a device such as a ratchet chain binder or other device, as it would be easier to use a wheel grinder or bolt cutter to gain access to the load that the ratchet chain binder is securing in place. Although, using a grinder or bolt cutter to cut the chain securing the load would indeed gain access to a secured load, the grinder or bolt cutter would create an amount of noise that the unauthorized person would like to avoid. A wheel grinder makes a substantial amount of noise and cutting a tensioned chain with a bolt cutter makes a substantial amount of noise when the chain is released from the tension, creating a loud popping noise.

A cylinder-pin by definition is non-threaded, threads on a cylinder-pin would make the cylinder-pin a screw. A cylinder-pin can also be defined as a peg. A spring cylinder-pin may be the preferable style of cylinder-pin to use since the spring cylinder-pin exerts outward pressure against the wall of the hole the cylinder-pin is inserted into allowing the cylinder-pin to stay in place in holes that are not perfectly round. In addition, the spring cylinder-pin can stay in place in holes that are of a slightly different diameter allowing the spring cylinder-pin to stay in place in a hole that over passing time and use has some wear on the hole walls that slightly enlarges the hole. One example of a usable spring cylinder-pin is a coiled spring cylinder-pin that maintains its shape and pressure exertion over many periods of time and use.

BRIEF DESCRIPTION OF THE DRAWINGS

A better understanding of the present invention will be had upon reference to the following description in conjunction with the accompanying drawings in which like numerals refer to like parts throughout the views wherein:

FIG. 2*b* is the disclosed invention cut-out view of a push-in-plunger-lock inserted into the housing-cylinder showing some of the internal parts of the lock. The lock is in the locked position with the plunger extended.

FIG. 3*b* is the disclosed invention cut-out view of a push-in-plunger-lock inserted into the housing-cylinder showing some of the internal parts of the lock. The lock is in the unlocked position with the plunger retracted.

DETAILED DESCRIPTION OF THE INVENTION

Reference Numerals

For the convenience of the reader, the following is a reference number used in this description of the invention.

Figure 1:
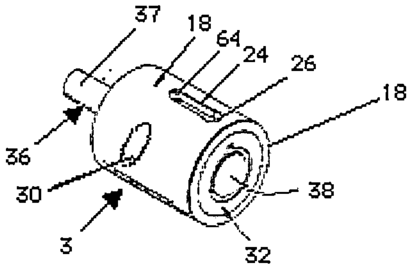
FIG. 1 prior art
FIG. 1 is a prior art perspective view of a of a push-in-plunger-lock.

1 lockable device (prior art)
2 lockable device fourth hole (prior art)
3 push-in-plunger-lock (prior art)
4 push-in-plunger-lock in the locked position
5 push-in-plunger-lock in the unlocked position
6 housing-cylinder
8 push-in-plunger-lock inserted in the housing-cylinder
9 housing-cylinder attachment to lockable device
10 housing-cylinder first open end (for attaching to a lockable device)
11 housing-cylinder second open end (for the insertion of the lock)
12 housing-cylinder third hole
13 cylinder-pin tail
14 cylinder-pin
15 cylinder-pin head
16 cylinder-pin installed-position
17 cylinder-pin unlocked-position
18 first-cylinder
19 first-cylinder end cap
20 first-cylinder first end (no end cap)
22 first-cylinder second end (with end cap)
24 first-cylinder slot (lengthwise)
26 first-cylinder slot stop position
28 first-cylinder first hole (in the second end with end cap)
30 first-cylinder second hole (in the wall of the first-cylinder)
32 second-cylinder
34 first-clearance-area
36 plunger
37 plunger first end (rod end)
38 plunger second end (keyed end)
39 plunger unlocked position
40 plunger locked position
42 grooved-notch (in plunger)
44 grooved-notch floor
46 grooved-notch top-side
48 grooved-notch bottom-side
50 grooved-notch left-side
52 grooved-notch right-side
54 key
56 pressure-inducing-device (spring or equivalent)
58 first-securing-device (spring and lock pin)
60 first-securing-device (spring)
62 first-securing-device (lock pin)
64 second-securing-device (set screw)
70 ratchet binder (lockable device)
72 ratchet binder U-pawl FIG. 1 is a perspective view of a prior art push-in-plunger-lock 3 in the locked position. The plunger 36 is shown in the locked and extended position with the plunger rod end 37 to the left in the drawing and the plunger keyed end 38 to the right in the drawing. The first-cylinder 18 is shown with the first-cylinder slot 24 in a lengthwise position in the first-cylinder 18. The second-securing-device 64 can be a screw or a set-screw, the set-screw may be preferable. The second-cylinder 32 is shown next to and surrounding the plunger keyed end 38. The first-cylinder stop position 26 is shown near the first-cylinder 18 first end without end cap 20. The second-securing-device 64 attached to the second-cylinder 32 secures the alignment of the second-cylinder 32 in the first-cylinder slot 24, the second-securing-device 64 moves inside the first-cylinder slot 24 and provides a stop position 26 at the first end of the first-cylinder slot 24 preventing the second-cylinder 32 from completely exiting the first-cylinder 18 first end 20, the first end 20 of the first-cylinder slot 24 being near the first end 20 of the first-cylinder 18. The first-cylinder second hole 30 is shown in an elongated hole.

Figure 2A:
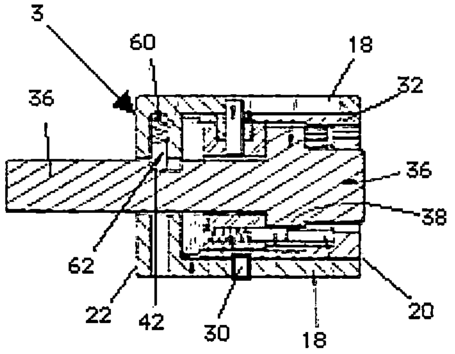
FIG. 2a prior art
FIG. 2*a* is a prior art cut-out view of a of a push-in-plunger-lock showing some of the internal parts of the lock. The lock is in the locked position with the plunger extended.

FIG. 2*a* is a cut out view of a prior art push-in-plunger-lock 3 in the locked position. Showing the first-cylinder first end without end cap 20, first-cylinder second end with end cap 22, the plunger 36, the first-securing-device comprising a spring 60 and a lock-pin 62. Showing the plunger 36 grooved notch 42 and the first-cylinder 18 surrounding the second-cylinder 32 that surrounds a portion of the plunger 36 keyed end 38. With the push-in-plunger-lock 3 moved to the locked position, the second-cylinder 32 passes by the first-cylinder 18 second hole 30, therefore covering and eliminating the first-clearance-area 34 (not shown, see FIG. 3) at the first-cylinder 18 second hole 30 location. The first-securing-device 60, 62 in the first-cylinder able to interact with a grooved-notch 42 in the plunger 36 for locking the plunger 36 in a linear position in the first-cylinder 18. The second-cylinder 32 being rotatably connected to the round cylindrical plunger 36, the plunger 36 linearly extending through the first-cylinder 18 second end first hole 28 (see FIG. 3), the second-cylinder 32 being lockable and un-lockable to the plunger 36 with a key 54 (see FIG. 4).

FIG. 2*b* Shows the disclosed invention cut-out view of a push-in-plunger-lock 3 inserted into the housing-cylinder 6. The push-in-plunger-lock 3 is in the locked position with the plunger 36 extended. This drawing is the same drawing as FIG. 2 except for the added disclosed invention housing-cylinder 6 including the housing-cylinder third hole 12.

Figure 3A:
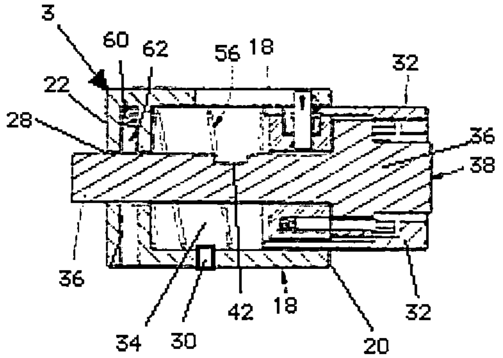
FIG. 3a prior art
FIG. 3*a* is a prior art cut-out view of a of a push-in-plunger-lock showing some of the internal parts of the lock. The lock is in the unlocked position with the plunger retracted.

FIG. 3*a* is a cut out view of a prior art push-in-plunger-lock 3 in the unlocked position. Showing the plunger 36, the first-securing-device 58 utilized as a spring 60 lock-pin 62. Showing the plunger 36 grooved notch 42 and the first-cylinder 18 surrounding the second-cylinder 32 that surrounds a portion of the plunger 36 keyed end 38. The pressure-inducing device 56 is shown as a coiled spring wrapped around the plunger 36. The first-clearance-area 34 is shown located between the plunger 36 and the first-cylinder 18. The first-cylinder first hole 28 is shown, this hole is in the first-cylinder 18 second end with an end cap 22. The opposing end of the first-cylinder 18 is the first-cylinder first end 20 without an end cap. The second-cylinder 32 movable in a linear direction in the first-cylinder first end 20. The first-clearance-area 34 between the inner wall of the first-cylinder 18 and the plunger 36, the first-clearance-area 34 being approximately equal to the difference of the inner wall of the first-cylinder 18 and the outer edge of the first hole 28 of the first-cylinder 18 second end 22. With the push-in-plunger-lock 3 in the unlocked position, the first-cylinder second hole 30 provides an access opening to the first-clearance-area 34. The pressure-inducing-device 56 creating outward pressure between the first-cylinder second end 22 and the second-cylinder 32. The pressure-inducing-device 56 can be a spring, coiled spring or multiple springs, the coiled spring can surround a portion of the plunger 36 if needed or preferred. The second-cylinder 32 surrounding a portion of the plunger 36, the rotation of the plunger 36 in the second-cylinder 32 allows the plunger 36 to be released from a linear locked position in the first-cylinder 18 creating an unlocked position of the plunger 36, the second-cylinder 32 moves in a linear motion with the plunger 36, the second-cylinder 32 is non-rotatable within the first-cylinder 18. The first-cylinder 18 comprising: i) a first end 20 without an end cap (see FIG. 2); ii) a second end 22 with an end cap and a first hole 28 (see FIG. 3) in the end cap; iii) a lengthwise slot 24 (see FIG. 1) in the wall of the first-cylinder 18; and iv) a second hole 30 in the wall of the first-cylinder 18 (see FIG. 1).

FIG. 3*b* Shows the disclosed invention cut-out view of a push-in-plunger-lock 3 inserted into the housing-cylinder 6 showing some of the internal parts of the push-in-plunger-lock 3. The push-in-plunger-lock 3 is in the unlocked position with the plunger 36 retracted. This drawing is the same drawing as FIG. 3 except for the added disclosed invention housing-cylinder 6 including the housing-cylinder third hole 12.

Figure 4:
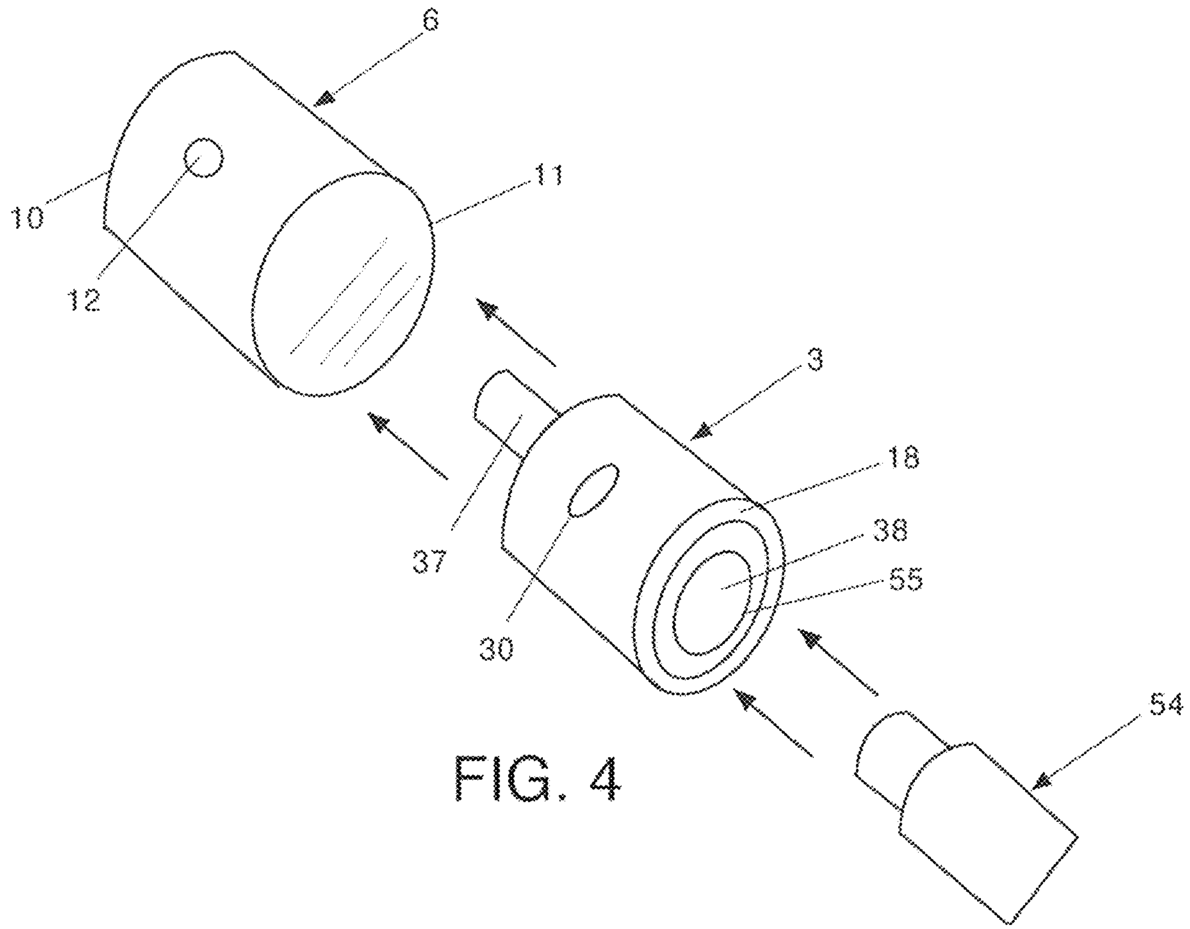
FIG. 4 is a perspective view of the push-in-plunger-lock and the disclosed invention housing-cylinder with the lock outside of the housing-cylinder.

FIG. 4 is a perspective view of the push-in-plunger-lock 3 and the disclosed invention housing-cylinder 6 with the push-in-plunger-lock 3 outside of the housing-cylinder 6. Also showing is the plunger first end 37, the plunger second end 38, the first-cylinder 18, and the first-cylinder second hole 30. The disclosed invention housing-cylinder 6 is shown ready to accept the insertion of the push-in-plunger-lock 3. The housing-cylinder third hole 12 is shown to align with the first-cylinder second hole 30 after insertion of the push-in-plunger-lock 3 first-cylinder 18 into the housing-cylinder 6 to accept the cylinder-pin 14 (see FIG. 5 and FIG. 8). The housing-cylinder first open end 10 is shown as the end to be utilized to attach to a lockable device 1, and the housing-cylinder second open end 11 is shown where the push-in-plunger-lock 3 will insert into the housing-cylinder 6. Key 54 is shown to be able to be inserted into the keyway 55. The key 54 for rotating the position of the plunger 36 within the first-cylinder and the second-cylinder.

Figure 5:
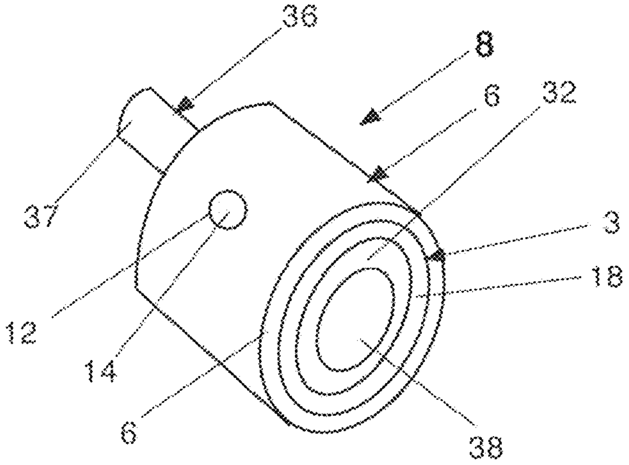
FIG. 5 is a perspective view of the push-in-plunger-lock and the disclosed invention housing-cylinder with the lock inserted in the housing-cylinder.

FIG. 5 is a perspective view of the push-in-plunger-lock 3 and the disclosed invention housing-cylinder 6 with the push-in-plunger-lock 3 inserted in the housing-cylinder 6 as a combination of 8. The cylinder-pin 14 is shown inserted and inserted in the housing-cylinder 6 while also inserted in the first-cylinder 18. The cylinder-pin 14 can be a dowel pin, a spring pin or a coiled spring pin, the spring pin or the coiled spring pin can be inserted in a hole that is not perfectly round and may still provide a very tight fit. The coiled spring pin may be the preferred choice for the cylinder-pin 6. The housing-cylinder 6 is shown encircling the first-cylinder 18, and the first-cylinder 18 is shown encircling the second-cylinder 32, and the second-cylinder 32 is shown encircling the plunger second end 38. The plunger 36 and the plunger first end 37 is shown as being in the locked and extended position.

Figure 6:
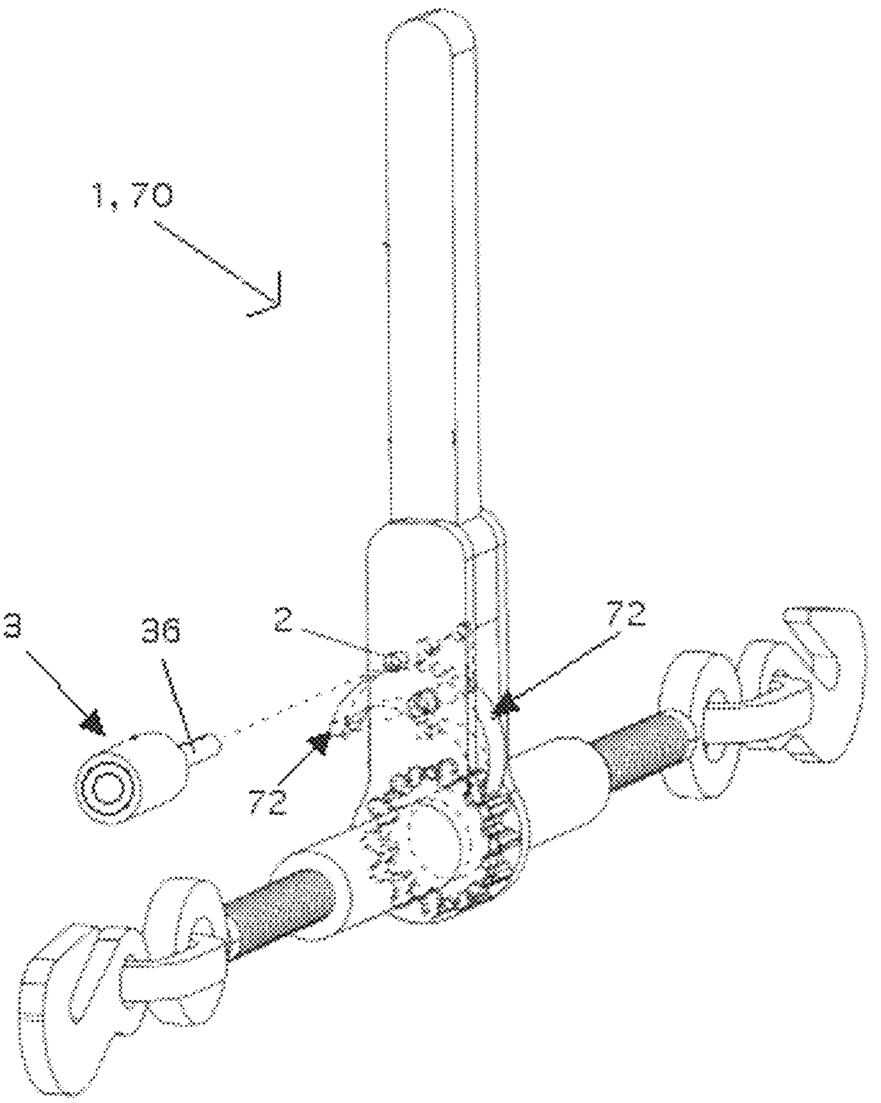
FIG. 6 prior art
FIG. 6 is a perspective view of a prior art push-in-plunger-lock ready for an attachment to a prior art lockable device being a ratchet chain binder.

FIG. 6 is a perspective view of a prior art push-in-plunger-lock 3 ready for an attachment to a prior art lockable device 1 being a ratchet chain binder 70. Shown is the lockable device 1 fourth hole 2 where the plunger 36 partially inserts while the lock is in the unlocked position prior to blocking the function of the lockable device 1 ratchet binder U-pawl 72 when in the locked and extended position, therefore preventing and blocking the U-pawl 72 of the ratchet binder 70 from being used to operate the ratchet binder 70 in the loosening rotational direction.

Figure 7:
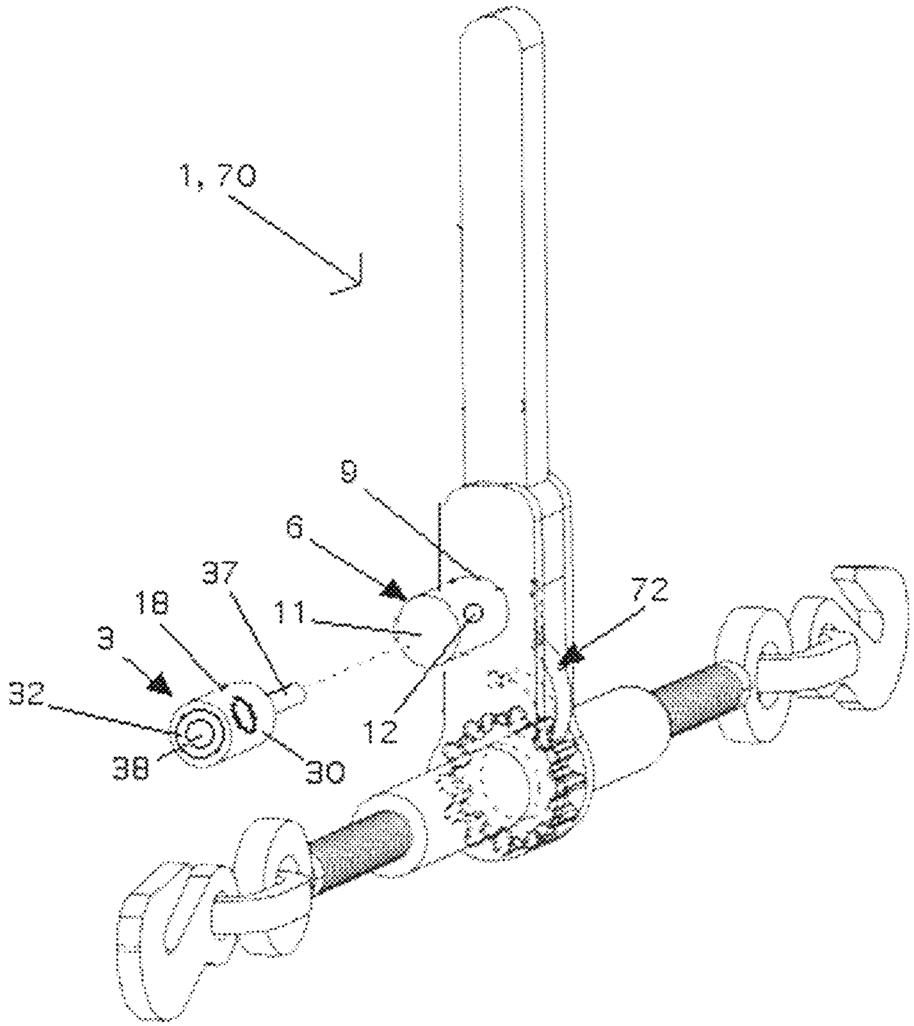
FIG. 7 is a perspective view of the push-in-plunger-lock ready for the insertion of the prior art lockable device into the disclosed invention housing-cylinder, the housing-cylinder attached to the ratchet chain binder.

FIG. 7 is a perspective view of the push-in-plunger-lock 3 ready for the insertion into the disclosed invention housing-cylinder 6 that is attached to the lockable device 1 ratchet binder 70. Shown is the housing-cylinder 6 attachment 9 to the lockable device 1 that would normally be metal welded to the lockable device 1. The first-cylinder 18 of the push-in-plunger-lock 3 is shown encircling the second-cylinder 32 and the second-cylinder 32 is shown encircling the plunger second end 38. The plunger first end 37 is shown ready for the insertion into the housing-cylinder 6 second end 11 and the ratchet binder 70 lockable device fourth hole 2 (not shown, see FIG. 6), therefore preventing and blocking the U-pawl 72 of the ratchet binder 70 from being used to operate the ratchet binder 70 in the loosening rotational direction. After insertion of the push-in-plunger-lock 3 into the housing-cylinder 6, the first-cylinder second hole 30 will align with the housing-cylinder third hole 12 to allow the insertion of the cylinder-pin 14 (not shown, see FIG. 5) to secure the push-in-plunger-lock 3 in place.

Figure 8A:
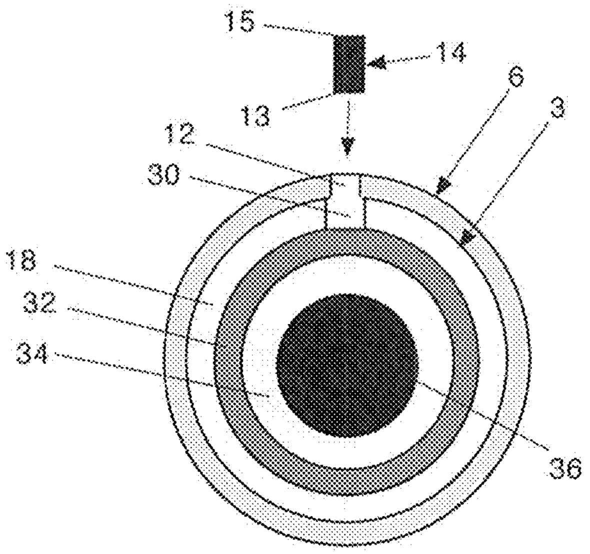
FIG. 8*a* is a top view of the push-in-plunger-lock and the disclosed invention housing-cylinder with the lock inserted in the housing-cylinder. In addition, the cylinder-pin is in the unlocked-position and the second-cylinder is in the locked position preventing the cylinder-pin from being pushed into the first-clearance-area, although the cylinder-pin is not installed in the housing-cylinder 6 or the first cylinder 18.

FIG. 8*a* is a top view of the push-in-plunger-lock 3 and the disclosed invention housing-cylinder 6 with the push-in-plunger-lock 3 inserted in the housing-cylinder 6. The push-in-plunger-lock 3 and plunger 36 are in a locked position (see FIG. 2*b*) and inserted into the disclosed invention housing-cylinder 6. In addition, the cylinder-pin 14 is not installed in the housing-cylinder third hole 12 or the first-cylinder second hole 30 allowing the push-in-plunger-lock 3 to be removed from the housing-cylinder. Also shown are the cylinder-pin head 15 and the cylinder-pin tail 13. The first-cylinder 18 is shown along with the second-cylinder 32 and the first-clearance-area 34.

Figure 8B:
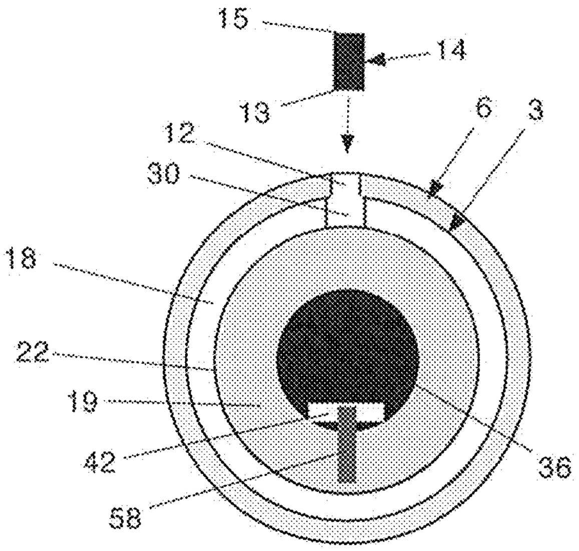
FIG. 8*b* is a top view of the push-in-plunger-lock and the disclosed invention housing-cylinder with the lock inserted in the housing-cylinder. In addition, the cylinder-pin is in the unlocked-position and the second-cylinder is in the unlocked position and showing the first-cylinder first end and the first end end-cap preventing. Also showing the first securing device and the grooved notch. The cylinder-pin is not installed in the housing-cylinder 6 or the first cylinder 18.

FIG. 8*b* is a top view of the push-in-plunger-lock 3 and the disclosed invention housing-cylinder 6 with the push-in-plunger-lock 3 inserted in the housing-cylinder 6. In addition, the cylinder-pin 14 is in the unlocked-position and the second-cylinder 32 (not shown) being in the unlocked position, and showing the first-cylinder second end 22 and the second end end-cap 19. Also showing the first securing device 58 and the grooved notch 42 of the plunger 36. The cylinder-pin 14 is not installed in the housing-cylinder 6 third hole 12 or the first cylinder 18 second hole 30.

Figure 9A:
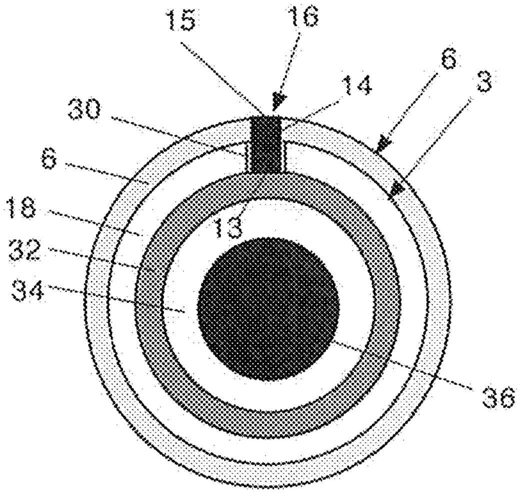
FIG. 9*a* is a top view of the push-in-plunger-lock and the disclosed invention housing-cylinder with the lock inserted in the housing-cylinder. In addition, the cylinder-pin is in the locked-position and the second-cylinder is in the locked position preventing the cylinder-pin from being pushed into the first-clearance-area.

FIG. 9*a* is a top view of the push-in-plunger-lock 3 and plunger 36 in a locked position 4 (see FIG. 2*b*) and inserted into the disclosed invention housing-cylinder 6. In addition, the cylinder-pin 14 shown in the locked-position 16 and the second-cylinder 32 is in the locked position preventing the cylinder-pin 14 from being pushed into the first-clearance-area 34. The cylinder-pin head 15 is shown even with the surface of the housing-cylinder 6. The housing-cylinder 6 is encircling the first-cylinder 18 and the first-cylinder 18 is encircling the second-cylinder 32, the second-cylinder 32 being in the locked position preventing the cylinder-pin 14 that is in the locked-position 16 and in the housing-cylinder third hole 12 and in the first-cylinder second hole 30 from being pushed into the first-clearance-area 34, therefore preventing the first-cylinder 18 and the push-in-plunger-lock 3 from being removed from the housing-cylinder 6. The cylinder-pin-tail 13 is shown stopped before making contact with the second-cylinder 32.

In addition in FIG. 9*a*, the cylinder-pin 14 in an installed-position maintains a locked-position of the push-in-plunger-lock 3 first-cylinder 18 and the housing-cylinder 6, the installed-position of the cylinder-pin 14 is when the cylinder-pin 14 is positioned in the housing-cylinder third hole 12 and the first-cylinder second hole 30 without entering the first-clearance-area 34 of the push-in-plunger-lock 3, in the installed position;

i) the cylinder-pin 14 prevents the first-cylinder 18 from being removed from the housing-cylinder 6; and ii) the outward facing end of the cylinder-pin 15 being even or nearly even with the outer surface of the housing-cylinder 6 preventing a pulling or turning outward removal of the cylinder-pin from the housing-cylinder third hole 12 or from the first-cylinder second hole 30.

And still in addition in FIG. 9*a*, with the push-in-plunger-lock 3 is in the locked position and the cylinder-pin 14 residing in the installed-position 16, the cylinder-pin 14 is prevented by the second-cylinder 32 from being pushed into the first-clearance-area 34 of the push-in-plunger-lock 3, therefore maintaining the installed-position 16 of the cylinder-pin and maintaining the locked-position of the first-cylinder 18 in the housing-cylinder preventing the push-in-plunger-lock 3 from being removed from the housing-cylinder 6.

Figure 9B:
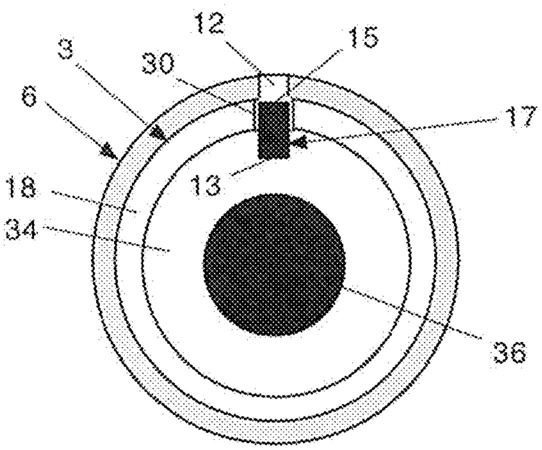
FIG. 9*b* is a top view of the push-in-plunger-lock and the disclosed invention housing-cylinder with the lock inserted in the housing-cylinder. In addition, the cylinder-pin is in the unlocked-position and the second-cylinder is in the unlocked position allowing the cylinder-pin to be pushed into the first-clearance-area.

FIG. 9*b* is a top view of the push-in-plunger-lock 3 and plunger 36 in an unlocked position 5 (see FIG. 3) and the push-in-plunger-lock 3 inserted in the disclosed invention housing-cylinder 6. In addition, the cylinder-pin 14 shown in the unlocked-position 17 with the cylinder-pin 14 and the cylinder-pin-tail 13 shown residing in the first-clearance-area 34. The cylinder-pin head 15 is shown even or below with the surface of the first-cylinder 18. The second-cylinder 32 (not shown, see FIG. 9*a*) is in the unlocked position and moved away from the first-cylinder second hole 30 and the cylinder-pin 14 allowing the cylinder-pin 14 to be pushed into the first-clearance-area 34. The housing-cylinder 6 is encircling the first-cylinder 18 and the first-cylinder 18 is encircling the second-cylinder 32 (although not shown to allow the first-clearance-area 34 to be fully shown), the second-cylinder 32 being in the unlocked position allowing the cylinder-pin 14 that is in the unlocked-position 17 and not residing in the housing-cylinder third hole 12. A portion of the cylinder-pin 14 residing in the first-cylinder second hole 30 and a portion of the cylinder-pin 14 residing in the first-clearance-area 34, therefore, allowing the first-cylinder 18 and the push-in-plunger-lock 3 to be being removed from the housing-cylinder 6.

In addition, in FIG. 9*b* with the push-in-plunger-lock 3 is in the unlocked position and the second-cylinder 32 moved away from the first-cylinder 18 second hole 30, the cylinder-pin 14 is enabled to be pushed into the first-clearance-area 34 dislodging the cylinder-pin 14 from the housing-cylinder 6 third hole 12 resulting in the first-cylinder 18 being unsecured from the housing-cylinder 6 allowing the push-in-plunger-lock 3 to be removed from the housing-cylinder 6.

Figure 10:
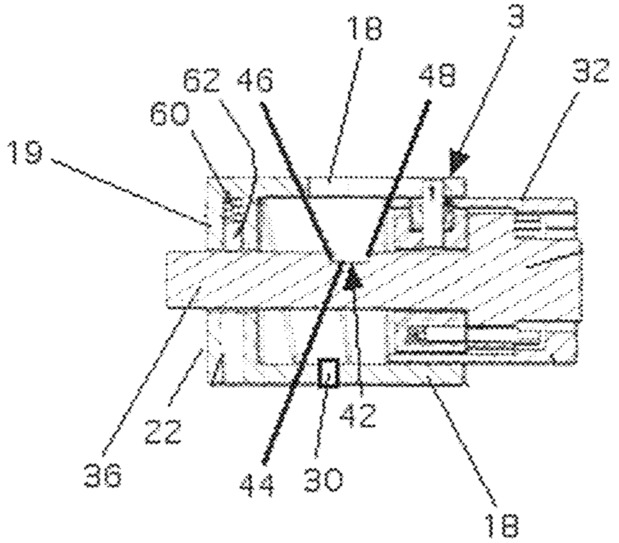
FIG. 10 is a cut out view of the push-in-plunger-lock showing some of the internal parts of the lock and especially the notch on the plunger. The lock is in the unlocked position with the plunger retracted.

FIG. 10 is a cut out view of a prior art push-in-plunger-lock 3 showing some of the internal parts of the lock and especially the notch on the plunger 36 and the notch 42 in the plunger 36. The lock is in the unlocked position with the plunger 36 retracted. Shown are the grooved notch 42 top-side 46, bottom-side 48, left-side 50 (see FIG. 11), and a right-side 52 (see FIG. 11).

Figure 11:
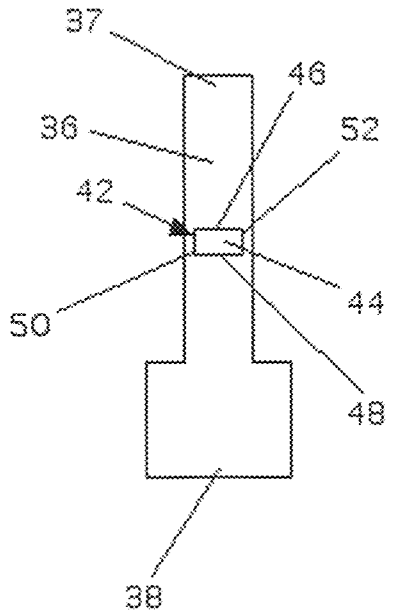
FIG. 11 is a cut out view of the push-in-plunger-lock showing only the plunger and the notch in the plunger.

FIG. 11 is a cut out view of a prior art push-in-plunger-lock 3 showing the plunger 36 and the grooved notch 42. The plunger 36 being orientated in a vertical position with the plunger 36 first end 37 at the top. Shown are the grooved notch 42 top-side 46, bottom-side 48, left-side 50, and a right-side 52. The plunger second end 38 is shown at the bottom. The grooved notch floor 44 is shown.

Figure 12:
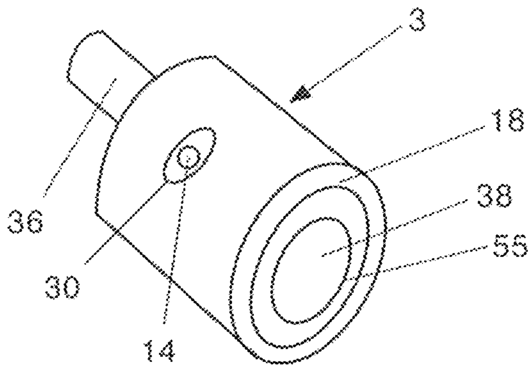
FIG. 12 is a perspective view of the push-in-plunger-lock showing the first-cylinder second hole and the loose fitting cylinder-pin in position in the first-cylinder second hole.

The first securing device 60, 62 (see FIG. 10) travels on the floor 44 of the grooved notch 42 to free itself from the grooved notch 42 top side 46 holding position when the plunger is rotated in either direction of rotation (see FIG. 2), therefore, allowing a linear retraction of the plunger 36 within the first-cylinder 18 creating an unlocked position of the push-in-plunger-lock 3 (see FIG. 2 and FIG. 3 for a comparison). When the push-in-plunger-lock 3 is inserted in the housing-cylinder 6 and the push-in-plunger-lock 3 moves from the locked position to the unlocked position or from the unlocked position to the locked position, the cylinder-pin 14 when in the installed-position 16 (see FIG. 9*a*) should not be able to make contact with the second-cylinder 32 as the second-cylinder 32 moves past the first-cylinder second hole 30 and the installed cylinder-pin 14 (see FIG. 8 and FIG. 9).

the grooved-notch 42 is positioned perpendicular to the plunger 36 length, the grooved-notch 42 cutting across approximately sixty degrees of the circumference of the plunger 36, viewing the plunger 36 in a vertical position and the second-cylinder 32 at the bottom of the plunger 36:

i) a top side 46 and a bottom side 48 of the grooved-notch 42 are at a ninety degree angle from a grooved-notch floor 44;

ii) the left and the right side of the grooved-notch floor 44 slopes into the round circumference of the plunger 36 allowing a smooth transition of the first-securing-device 60, 62 from the grooved-notch 42 onto the round circumference of the plunger 36, therefore, unlocking the plunger 36 from the first-cylinder 18 linear locked position;

iii) the top and bottom side of the grooved-notch 42 enables the plunger 36 to be linearly locked in place in the first-cylinder 18 near the first-cylinder second end 22 (see FIG. 10), when the grooved-notch 42 is pushed to the first securing device 60, 62, the first-securing-device 60, 62 inserts itself into the grooved-notch 42 to lock the plunger 36 linearly in place; and iv) the left and the right side of the grooved-notch 42 enables the plunger 36 to become unsecured from the first-securing-device 60, 62 during a rotation of the plunger 36 by the key 54 (see FIG. 4), the first-securing-device 60, 62 interacting with and exiting the floor 44 of the grooved-notch 42 to free the grooved-notch 42 from the first-securing-device 60, 62, therefore, allowing a linear retraction of the plunger 36 within the first-cylinder 18 creating an unlocked position of the push-in-plunger-lock 3;

FIG. 12 is a perspective view of the push-in-plunger-lock showing the first-cylinder second hole 30 and the loose fitting cylinder-pin 14 in position in the first-cylinder second hole 30.

Functionality of the related parts of the disclosed invention:

The housing-cylinder third hole 12 can have varying positions in the housing-cylinder 6 as long as the third hole 12 aligns with the first-cylinder second hole 30. The cylinder-pin 14 is then blocked from entering the first-clearance-area 34 by the second-cylinder 32 when the push-in-plunger-lock 3 is in the locked position.

The foregoing detailed description is given primarily for clearness of understanding and no unnecessary limitations are to be understood there from, for modification will become obvious to those skilled in the art upon reading this disclosure and may be made without departing from the spirit of the invention and scope of the appended claims.

The invention claimed is:

1. A push-in-plunger-lock and a housing-cylinder comprising:

I) the push-in-plunger-lock comprising:

a) a first-cylinder comprising:

i) a first end without an end cap;

ii) a second end with an end cap and a first hole in the end cap;

iii) a lengthwise slot in the wall of the first-cylinder; and iv) a second hole in the wall of the first-cylinder;

b) a second-cylinder being rotatably connected to a round cylindrical plunger, the plunger linearly extending through the first-cylinder second end first hole, the second-cylinder being lockable and unlockable to the plunger with a key;

c) the second-cylinder surrounding a portion of the plunger, the rotation of the plunger in the second-cylinder allows the plunger to be released from a linear locked position in the first-cylinder creating an unlocked position of the plunger, the second-cylinder moves in a linear motion with the plunger, the second-cylinder is non-rotatable within the first-cylinder;

d) the key for rotating the position of the plunger within the first-cylinder and the second-cylinder;

e) the second-cylinder movable in a linear direction in the first-cylinder first end;

f) a pressure-inducing-device creating outward pressure between the first-cylinder second end and the second-cylinder;

g) a first-securing-device in the first-cylinder able to interact with a grooved-notch in the plunger for locking the plunger in a linear position in the first-cylinder;

h) the grooved-notch positioned perpendicular to the plunger length, the grooved-notch cutting across approximately sixty degrees of a circumference of the plunger, viewing the plunger in a vertical position and the second-cylinder at the bottom of the plunger:

i) a top side and a bottom side of the grooved-notch are at a ninety degree angle from a grooved-notch floor;

ii) the left and the right side of the grooved-notch floor slopes into the round circumference of the plunger allowing a smooth transition of the first-securing-device from the grooved-notch onto the round circumference of the plunger, therefore, unlocking the plunger from the first-cylinder linear locked position;

iii) the top and bottom side of the grooved-notch enables the plunger to be linearly locked in place in the first-cylinder near the first-cylinder second end, when the grooved-notch is pushed to the first securing device, the first-securing-device inserts itself into the grooved-notch to lock the plunger linearly in place; and iv) the left and the right side of the grooved-notch enables the plunger to become unsecured from the first-securing-device during a rotation of the plunger by the key, the first-securing-device interacting with and exiting the floor of the grooved-notch to free the grooved-notch from the first-securing-device, therefore, allowing a linear retraction of the plunger within the first-cylinder creating an unlocked position of the push-in-plunger-lock;

i) a second-securing-device attached to the second-cylinder secures the alignment of the second-cylinder in the first-cylinder slot, the second-securing-device moves inside the first-cylinder slot and provides a stop position at the first end of the first-cylinder slot preventing the second-cylinder from completely exiting the first-cylinder first end, the first end of the first-cylinder slot being near the first end of the first-cylinder;

j) a first-clearance-area between the inner wall of the first-cylinder and the plunger, the first-clearance-area being approximately equal to the difference of the inner wall of the first-cylinder and the outer edge of the first hole of the first-cylinder second end;

k) with the push-in-plunger-lock moved to the locked position, the second-cylinder passes by the first-cylinder second hole, therefore covering and eliminating the first-clearance-area at the second hole location;

l) with the push-in-plunger-lock in the unlocked position, the second hole provides an access opening to the first-clearance-area;

II) the housing-cylinder comprising;

a) a first open end and a second open end, the first open end utilized for attaching to a lockable device such as a ratchet chain binder, the second open end utilized for the insertion of the push-in-plunger-lock;

b) a third hole in the housing-cylinder aligns with the push-in-plunger-lock first-cylinder second hole after insertion of the push-in-plunger-lock first-cylinder into the housing-cylinder;

c) a cylinder-pin that fits into the housing-cylinder third hole in a very tight fit and the cylinder-pin to fits into the first-cylinder second hole in a loose fit, mandating the housing-cylinder third hole comprise a smaller diameter hole when compared to any diameter of the first-cylinder second hole, and therefore, attaching the housing-cylinder to the first-cylinder, d) the cylinder-pin in an installed-position maintains a locked-position of the push-in-plunger-lock first-cylinder and the housing-cylinder, the installed-position of the cylinder-pin is when the cylinder-pin is positioned in the housing-cylinder third hole and the first-cylinder second hole without entering the first-clearance-area of the push-in-plunger-lock, in the installed position;

i) the cylinder-pin prevents the first-cylinder from being removed from the housing-cylinder; and ii) the outward facing end of the cylinder-pin being even or nearly even with the outer surface of the housing-cylinder preventing a pulling or turning outward removal of the cylinder-pin from the housing-cylinder third hole or from the first-cylinder second hole;

e) with the push-in-plunger-lock is in the locked position and the cylinder-pin residing in the installed-position, the cylinder-pin is prevented by the second-cylinder from being pushed into the first-clearance-area of the push-in-plunger-lock, therefore maintaining the installed-position of the cylinder-pin and maintaining the locked-position of the first-cylinder in the housing-cylinder preventing the push-in-plunger-lock from being removed from the housing-cylinder; and f) with the push-in-plunger-lock is in the unlocked position and the second-cylinder moved away from the first-cylinder second hole, the cylinder-pin is enabled to be pushed into the first-clearance-area dislodging the cylinder-pin from the housing-cylinder third hole resulting in the first-cylinder being unsecured from the housing-cylinder allowing the push-in-plunger-lock to be removed from the housing-cylinder.

2. The push-in-plunger-lock and the housing cylinder of claim 1 wherein the first-securing-device comprises a spring and a pin.

3. The push-in-plunger-lock and the housing cylinder of claim 1 wherein the second-securing-device comprises a screw.

4. The push-in-plunger-lock and the housing cylinder of claim 3 wherein the screw is a set-screw.

5. The push-in-plunger-lock and the housing cylinder of claim 1 wherein the cylinder-pin is a dowel pin.

6. The push-in-plunger-lock and the housing cylinder of claim 1 wherein the cylinder-pin is a spring pin.

7. The push-in-plunger-lock and the housing cylinder of claim 6 wherein the spring pin is a coiled spring pin.

8. The push-in-plunger-lock and the housing cylinder of claim 1 wherein the pressure-inducing-device comprises a spring.

9. The push-in-plunger-lock and the housing cylinder of claim 8 wherein the spring is a coiled spring.

10. The push-in-plunger-lock and the housing cylinder of claim 9 wherein the coiled spring surrounds a portion of the plunger.

11. The push-in-plunger-lock and the housing cylinder of claim 1 wherein the pressure-inducing-device comprises multiple springs.

12. The push-in-plunger-lock and the housing cylinder of claim 11 wherein the multiple springs are coiled springs.

13. The push-in-plunger-lock and the housing cylinder of claim 1 wherein the first-cylinder second hole is elongated or oval in shape.

14. A system comprising:

a) the push-in-plunger-lock and the housing-cylinder of claim 1;

b) a lockable device wherein the housing-cylinder is attached to the lockable device and the push-in-plunger-lock is inserted and secured in the housing cylinder with the cylinder-pin.

* * * * *